United States Patent [19]

Ishii et al.

[11] Patent Number: 4,829,112
[45] Date of Patent: May 9, 1989

[54] POLYOLEFIN RESIN COMPOSITION

[75] Inventors: Tamaki Ishii, Suita; Shinichi Yachigo, Toyonaka; Taisuke Okita, Sakai; Manji Sasaki, Ibaraki; Chinehito Ebina, Minoo, all of Japan

[73] Assignee: Sumitomo Chemical Co., Ltd., Osaka, Japan

[21] Appl. No.: 129,937

[22] Filed: Dec. 3, 1987

Related U.S. Application Data

[63] Continuation of Ser. No. 893,639, Aug. 7, 1986, abandoned.

[51] Int. Cl.$^4$ .............................. C08K 5/52; C08K 5/53
[52] U.S. Cl. .................................... 524/108; 524/126; 524/753; 524/120; 524/151
[58] Field of Search ................ 524/126, 120, 153, 151, 524/291, 108

[56] References Cited

U.S. PATENT DOCUMENTS 4,670,493  6/1987  Asbroeck et al. .................... 524/126
4,717,745  1/1988  Ishii et al. ............................ 524/120
4,721,744  1/1988  Ishii et al. ............................ 524/120

FOREIGN PATENT DOCUMENTS 59-25826  9/1984  Japan .

OTHER PUBLICATIONS

T. J. Henman "Melt Stabilization of Polypropylene" 39,76 to 83 of *Developments in Polymer Stabilization*-1, Gerald Scot, ed. (1979).

*Primary Examiner*—Veronica P. Hoke
*Attorney, Agent, or Firm*—Wenderoth, Lind & Ponack

[57] ABSTRACT

A thermally stable polyolefin resin improved in thermal processing by the incorporation therein of a phenolic compound represented by the general formula:

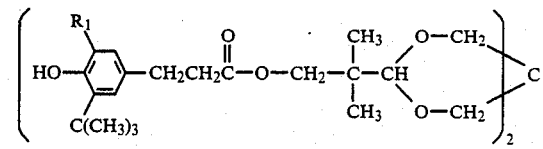

wherein $R_1$ represents a hydrogen atom or a $C_1$-$C_3$ alkyl group, and a phosphite or phosphonite compound of 0.1 to 15 times by weight based on the phenolic compound.

7 Claims, No Drawings

POLYOLEFIN RESIN COMPOSITION

This application is a continuation of application Ser. No. 893,639, filed Aug. 7, 1986, now abandoned.

The present invention relates to a polyolefin resin composition improved in stability to thermal processing.

Polyolefin resins have excellent physical, chemical and electrical properties, so that they are processed into molded products, pipes, sheets, films, fibers, etc. by various methods such as blow molding, extrusion molding, injection molding, calendering, etc. and used in many fields. It is well known that when polyolefin resins are used alone, they deteriorate in quality by the action of heat and oxygen on processing to show phenomena such as softening, embrittlement, discoloration, etc., and as a result, their mechanical properties are too remarkably lowered for practical use.

For the purpose of solving such problem, it is also so far well known to add various kinds of phenolic antioxidants, phosphite ones, etc. during the processing of polyolefin resins. For example, methods are well known in which phenolic antioxidants such as 2,6-ditert-butyl-4-methylphenol, 2,2'-methylenebis(4-methyl-6-tert-butylphenol), 4,4'-butylidenebis(3-methyl-6-tert-butylphenol), pentaerythritol tetrakis [3-(3,5-di-tert-butyl-4-hydroxyphenyl)propionate], n-octadecyl 3-(3,5-di-tert-butyl-4-hydroxyphenyl)propionate, etc. are used alone, or they are used in combination with phosphite antioxidants such as tris(nonylphenyl)phosphite, tris(2,4-di-tert-butylphenyl)-phosphite, dipentaerythritol diphosphite, etc.

These methods, however, are not yet quite satisfactory in terms of thermal and oxidation stability, thermal discoloration resistance, etc., methods producing higher performances having been demanded.

The present inventors extensively studied to solve these problems, and as a result, found that a polyolefin resin composition having a very high resistance to deterioration by the action of heat and oxygen at the time of processing is obtained by blending polyolefin resins with a phenolic compound of particular structure and a phosphorous compound in a particular proportion to the phenolic compound. The present inventors thus attained to the present invention.

The present invention provides a polyolefin resin composition improved in stability to thermal processing containing a phenolic compound represented by the general formula (I),

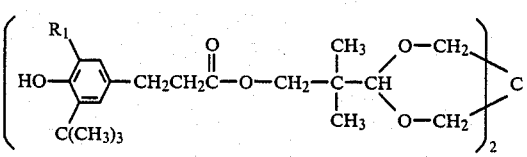 (I)

wherein $R_1$ represents a hydrogen atom or a $C_1$–$C_3$ alkyl group, and a phosphorous compound of 0.1 to 15 times by weight based on the phenolic compound.

The phenolic compound represented by the general formula (I) used in the present invention can easily be produced by esterification of a dihydric alcohol represented by the formula (II),

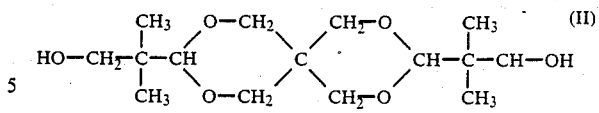 (II)

with a propionic acid represented by the general formula (III),

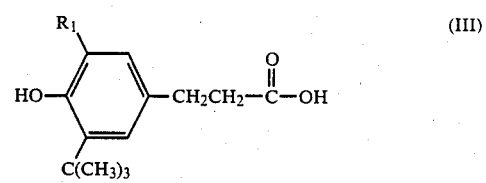 (III)

wherein $R_1$ has the same meaning as described above, or its acid halide, acid anhydride or lower alkyl ester.

In this phenolic compound represented by the general formula (I), $R_1$ represents a hydrogen atom or a methyl, ethyl, n-propyl or isopropyl group, but a methyl group is preferred in terms of the deterioration preventing effect on processing.

Representative examples of the phosphorous compound used in the present invention include the following compounds represented by the general formula (IV-1), (IV-2) and (IV-3), respectively;

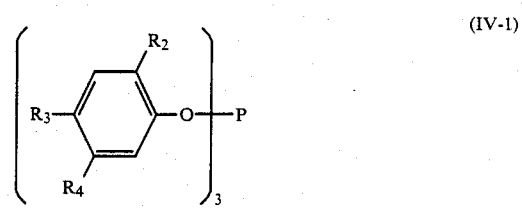 (IV-1)

wherein $R_2$, $R_3$ and $R_4$ each represents a hydrogen atom or a $C_1$–$C_9$ alkyl group, but $R_3$ and $R_4$ are not a branched alkyl group at the same time;

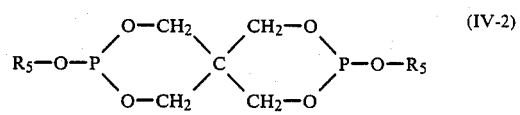 (IV-2)

wherein $R_5$ represents a $C_8$–$C_{18}$ alkyl or $C_6$–$C_{18}$ aryl group; and

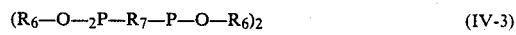
$(R_6-O-_2P-R_7-P-O-R_6)_2$ (IV-3)

wherein $R_6$ represents a $C_8$–$C_{18}$ alkyl or $C_6$–$C_{18}$ aryl group, and $R_7$ represents a $C_6$–$C_{18}$ alkylene or $C_6$–$C_{18}$ arylene group.

Of the phosphite compounds represented by the general formula (IV-1), preferred ones include tris(2,5-di-tert-butylphenyl)phosphite, tris(2-tert-butylphenyl)-phosphite, tris[2,4-bis(1,1-dimethylpropyl)-phenyl]phosphite and tris(2,4-di-tert-butylphenyl)phoshite.

Of the phosphite compounds represented by the general formula (IV-2), preferred ones include dilauryl pentaerythritol diphosphite, distearyl pentaerythritol diphosphite, bis(2,5-di-tert-butylphenyl) pentaerythritol diphosphite and bis(2,4-di-tert-butylphenyl) pentaerythritol diphosphite.

Of the phosphorous compounds represented by the general formula (IV-3), preferred ones include tetrastearyl-4,4'-biphenylene diphosphonite and tetrakis(2,4-di-tert-butylphenyl)-4,4'-biphenylene diphosphonite.

The present invention comprises blending polyolefin resins with the foregoing phenolic compound and phosphorous compound, and the mixing ratio of the both compounds is 1 to 0.1–15 by weight, preferably 1 to 0.5–50 weight, more preferably 1 to 1–5 by weight.

The effect of the present invention is developed by blending not less than 0.01 wt.% of a total amount of the phenolic compound and phosphorous compound based on polyolefin resins. Generally, however, the amount blended is 0.1 to 10 wt.%.

Amounts exceeding 10 wt.% may be blended, which is however economically disadvantageous because sufficient effects enough to correspond to such amounts are not readily obtained.

The polyolefin resin composition of the present invention may contain other additives such as ultraviolet absorbers, light stabilizers, antioxidants, metal deactivators, metal soaps, nucleating agents, lubricants, antistatic agents, flame retardants, pigments, fillers, etc.

Polyolefin resins stabilized by the present invention include poly-α-olefins such as low-density polyethylene, medium- to high-density polyethylene, linear low-density polyethylene, polypropylene, polybutene-1, etc., poly-α-olefin copolymers such as propylene/ethylene random or block copolymers, ethylene/butene-1 random copolymers, etc., copolymers of poly-α-olefin with a vinyl monomer such as maleic anhydride-modified polypropylene, etc., and mixtures thereof. Further, there are given blends of the polyolefin resins with rubbers such as isoprene rubber (IR), butyl rubber (IIR), nitrile rubber (NBR), styrene/butadiene copolymeric rubber (SBR), ethylene/propylene rubber (EPM, EPDM), etc. Particularly, the present invention is effective to stabilize polypropylene.

The present invention will be illustrated in detail with reference to the following examples, but it is not limited to these examples.

Preparation example 1

To a mixture of 30.2 g (0.121 mole) of methyl 3-(3-tert-butyl-4-hydroxy-5-methylphenyl)propionate and 15.3 g (0.0503 mole) of 3,9-bis(2-hydroxy-1,1-dimethylethyl)-2,4,8,10-tetraoxaspiro[5.5]undecane was added 0.82 g (0.015 mole) of sodium methoxide. The mixture was heated and reacted at a temperature of 140° C. for 3 hours and then at a temperature of from 140° to 160° C. for 7 hours under a reduced pressure of 50 mmHg.

After completion of the reaction, the reaction mass was dissolved in toluene and washed with aqueous dilute hydrochloric acid and then with water. Toluene was then removed under reduced pressure to obtain 42.9 g of a crude product of 77% in purity. This crude product was purified by column chromatography on silica gel to obtain 24 g of colorless and glassy 3,9-bis{2-[3-(3-tert-butyl-4-hydroxy-5-methylphenyl)propionyloxy]-1,1-dimethylethyl}-2,4,8,10-tetraoxaspiro[5.5]undecane having a purity of 99% (Compound I-1). m.p., 45°–55° C.

Preparation example 2

A mixture of 33.6 g (0.121 mole) of methyl 3-(3-tert-butyl-4-hydroxy-5-isopropylphenyl)propionate, 15.3 l g (0.0503 mole) of 3,9-bis(2-hydroxy-1,1-dimethylethyl)-2,4,8,10-tetraoxaspiro[5.5]undecane and 0.82 g (0.015 mole) of sodium methoxide was reacted, after-treated and purified in the same manner as in Preparation example 1, to obtain 29 g of colorless and glassy 3,9-bis{2-[3-(3-tert-butyl-4-hydroxy-5-isopropylphenyl)propionyloxy]-1,1-dimethylethyl}-2,4,8,10-tetraoxaspiro[5.5]undecane having a purity of 98% (compound I-2). m.p., 47°–57° C.

Preparation example 3 ,

A mixture of 35.3 g (0.121 mole) of methyl 3-(3,5-di-tert-butyl-4-hydroxyphenyl)propionate, 15.3 g (0.0503 mole) of 3,9-bis(2-hydroxy-1,1-dimethylethyl)-2,4,8,10-tetraoxaspiro[5.5]undecane and 0.82 g (0.015 mole) of sodium methoxide was reacted, after-treated and purified in the same manner as in Preparation example 1, to obtain 21 g of white crystalline 3,9-bis{2-[3-(3,5-di-tert-butyl-4-hydroxyphenyl)propionyloxy]-1,1-dimethylethyl}-2,4,8,10-tetraoxaspiro[5.5]-undecane having a purity of 99% (compound AO-1). m.p., 98°–100° C.

Example 1

The blend described below was dry-blended and extruded five times running on a small extruder [screw diameter (D), 30 mmϕ; L/D=22] under the following condition. Pellets after 1st, 3rd and 5th extrusions were measured for melt index to evaluate processing stability.

The results are shown in Table 1.

Measurement condition for melt index:
According to JIS K 7210
Temperature, 230° C.
Load, 2,160 g
Extrusion condition:

| Number of rotations, 50 rpm | | | |
| Temperature, | $C_1$ | $C_2$ | D |
| | 190° C. | 220° C. | 210° C. |

Compounding:

| | Part by weight |
| --- | --- |
| Unstabilized polypropylene resin | 100 |
| Calcium stearate | 0.05 |
| Test compound | described in Table 1 |

Of the symbols of the test compounds in Table 1, ones other than those described above mean the following compounds:

AO-2: Pentaerythritol tetrakis[3(3,5-di-tert-butyl-4-hydroxyphenyl)-propionate]

AO-3: n-Octadecyl 3-(3,5-di-tert-butyl-4-hydroxyphenyl)propionate

AO-4: Tris(2,4-di-tert-butylphenyl)phosphite

AO-5: Distearyl pentaerythritol diphosphite

AO-6: Bis(2,4-di-tert-butylphenyl) pentaerythritol diphosphite

AO-7: Tetrakis(2,4-di-tert-butylphenyl)-4,4'-biphenylene diphosphonite

TABLE 1

| Example | No. | Phenolic compound Kind | Phenolic compound Part by weight | Phosphorous compound Kind | Phosphorous compound Part by weight | Melt index after repetition of extrusion 1st | 3rd | 5th |
|---|---|---|---|---|---|---|---|---|
| Present example | 1 | I-1 | 0.025 | AO-4 | 0.075 | 3.5 | 4.3 | 6.2 |
| | 2 | " | 0.05 | " | 0.05 | 3.6 | 4.7 | 6.9 |
| | 3 | " | 0.025 | AO-5 | 0.075 | 3.7 | 5.1 | 6.7 |
| | 4 | " | " | AO-6 | " | 3.3 | 3.9 | 5.6 |
| | 5 | " | " | AO-7 | " | 3.5 | 4.3 | 6.0 |
| | 6 | I-2 | " | AO-4 | " | 3.7 | 4.5 | 6.5 |
| | 7 | " | 0.05 | " | 0.05 | 3.9 | 5.0 | 7.3 |
| | 8 | " | 0.025 | AO-5 | 0.075 | 3.9 | 5.4 | 7.6 |
| | 9 | " | " | AO-6 | " | 3.4 | 4.2 | 6.1 |
| | 10 | " | " | AO-7 | " | 3.8 | 4.7 | 6.8 |
| Comparative example | 11 | I-1 | 0.05 | — | — | 5.7 | 10.8 | 19.9 |
| | 12 | I-2 | " | — | — | 5.8 | 11.3 | 21.0 |
| | 13 | AO-1 | " | — | — | 9.2 | 29.3 | 46.0 |
| | 14 | AO-2 | " | — | — | 7.5 | 19.5 | 36.1 |
| | 15 | AO-3 | " | — | — | 8.7 | 26.1 | 43.8 |
| | 16 | — | — | AO-4 | 0.05 | 6.9 | 17.3 | 32.1 |
| | 17 | — | — | AO-5 | " | 9.5 | 30.1 | 47.2 |
| | 18 | — | — | AO-6 | " | 6.3 | 12.8 | 29.3 |
| | 19 | — | — | AO-7 | " | 6.5 | 13.4 | 30.6 |
| | 20 | AO-1 | 0.025 | AO-4 | 0.075 | 5.5 | 10.2 | 19.1 |
| | 21 | " | 0.05 | " | 0.05 | 6.8 | 12.7 | 22.9 |
| | 22 | " | 0.025 | AO-5 | 0.075 | 9.2 | 26.9 | 41.0 |
| | 23 | " | " | AO-6 | " | 5.0 | 6.5 | 9.3 |
| | 24 | " | " | AO-7 | " | 5.2 | 7.1 | 10.3 |
| | 25 | AO-2 | " | AO-4 | " | 5.2 | 10.0 | 18.6 |
| | 26 | " | 0.05 | " | 0.05 | 6.7 | 12.3 | 22.5 |
| | 27 | " | 0.025 | AO-5 | 0.075 | 9.0 | 25.7 | 39.0 |
| | 28 | " | " | AO-6 | " | 4.8 | 6.0 | 8.7 |
| | 29 | " | " | AO-7 | " | 5.0 | 6.7 | 9.2 |
| | 30 | AO-3 | " | AO-6 | " | 5.5 | 8.2 | 11.2 |
| | 31 | — | — | — | — | 12.1 | 35.2 | 69.2 |

Example 2

Procedure was carried out in the same manner as in Example 1 except that the extrusion condition was changed as follows, to evaluate the processing stability. The results are shown in Table 2.

Extrusion condition:

| Number of rotations, 30 rpm | | | |
|---|---|---|---|
| Temperature, | $C_1$ 220° C. | $C_2$ 250° C. | D 240° C. |

TABLE 2

| Example | No. | Phenolic compound Kind | Phenolic compound Part by weight | Phosphorous compound Kind | Phosphorous compound Part by weight | Melt index after repetition of extrusion 1st | 3rd | 5th |
|---|---|---|---|---|---|---|---|---|
| Present example | 1 | I-1 | 0.025 | AO-4 | 0.075 | 6.6 | 18.5 | 35.5 |
| | 2 | " | " | AO-5 | " | 6.7 | 19.6 | 37.3 |
| | 3 | " | " | AO-6 | " | 5.9 | 13.0 | 27.8 |
| | 4 | " | " | AO-7 | " | 6.5 | 18.3 | 35.4 |
| | 5 | I-2 | " | AO-4 | " | 6.9 | 18.9 | 35.8 |
| | 6 | " | " | AO-5 | " | 7.1 | 20.7 | 40.0 |
| | 7 | " | " | AO-6 | " | 6.1 | 13.3 | 28.0 |
| | 8 | " | " | AO-7 | " | 6.8 | 18.6 | 35.7 |
| Comparative example | 9 | AO-1 | " | AO-4 | " | 9.6 | 29.2 | 55.6 |
| | 10 | " | " | AO-5 | " | 10.4 | 31.3 | 57.7 |
| | 11 | " | " | AO-6 | " | 9.3 | 28.2 | 51.0 |
| | 12 | " | " | AO-7 | " | 9.5 | 28.7 | 53.2 |
| | 13 | AO-2 | " | AO-4 | " | 9.3 | 28.2 | 51.3 |
| | 14 | " | " | AO-5 | " | 10.0 | 30.8 | 55.7 |
| | 15 | " | " | AO-6 | " | 8.9 | 27.3 | 49.3 |
| | 16 | " | " | AO-7 | " | 9.2 | 28.0 | 50.9 |
| | 17 | AO-3 | " | AO-4 | " | 9.8 | 31.0 | 59.1 |
| | 18 | " | " | AO-5 | " | 10.6 | 32.8 | 61.0 |
| | 19 | " | " | AO-6 | " | 9.5 | 30.1 | 54.2 |
| | 20 | " | " | AO-7 | " | 9.7 | 30.5 | 56.2 |
| | 21 | — | — | — | — | 23.1 | 75.2 | — |

What is claimed is:

1. A polyolefin resin composition improved in stability to thermal processing comprising of a polyolefin resin, a phenolic compound in an amount effective to prevent deterioration of the polyolefin resin due to heat and oxidation, and a phosphorous compound in an amount of 0.5 to 10 times by weight based on the weight of the phenolic compound, said phenolic compound being represented by the formula:

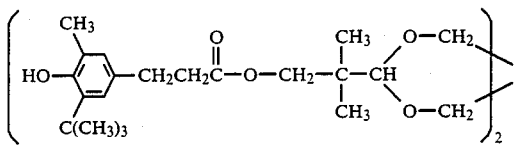

and said phosphorous compound being one member selected from the group consisting of the compounds represented by the structural formulas (IV-1), (IV-2), and (IV-3), recited below:
(a) a phosphite compound represented by the formula (IV-1):

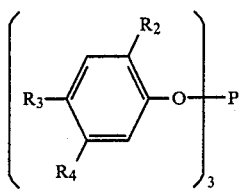

(IV-1)

wherein $R_2$, $R_3$ and $R_4$ each represent a hydrogen atom or a $C_1$–$C_9$ alkyl group, but $R_3$ and $R_4$ are not a branched alkyl group at the same time,
(b) a phosphite compound represented by the formula (IV-2):

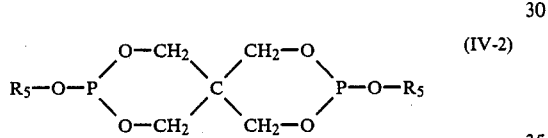

(IV-2)

wherein $R_5$ represents a $C_8$–$C_{18}$ alkyl or $C_6$–$C_{18}$ aryl group, or
(c) a phosphorous compound represented by the formula (IV-3):

$$(R_6-O_2-P-R_7-P-O-R_6)_2 \qquad (IV-3)$$

wherein $R_6$ represents a $C_8$–$C_{18}$ alkyl or $C_6$–$C_{18}$ aryl group, and $R_7$ represents a $C_6$–$C_{18}$ alkylene or a $C_6$–$C_{18}$ arylene group.

2. The polyolefin resin composition as claimed in claim 1, wherein the phosphorous compound is the one represented by the formula (IV-1) and is selected from the group consisting of tris(2,5-di-tert-butylphenyl)-phosphite, tris(2-tert-butylphenyl)phosphite, tris[2,4-bis(1,1-dimethylpropyl)-phenyl]phosphite and tris(2,4-di-tert-butylpheny) phosphite.

3. The polyolefin resin composition as claimed in claim 1, wherein the phosphorous compound is the one represented by the formula (IV-2) and is selected from the group consisting of dilauryl pentaerythritol diphosphite, distearyl pentaerythritol disphosphite, bis(2,5-di-tert-butylphenyl)pentaerythritol diphosphite and bis(2,4-di-tert-butylphenyl)pentaerythritol disphosphite.

4. The polyolefin resin composition as claimed in claim 1, wherein the phosphorous compound is the one represented by the formula (IV-3) and is selected from the group consisting of tetrastearyl-4,4'-bisphenylene diphosphonite and tetrakis(2,4-di-tert-butylphenyl)-4,4'-biphenylene diphosphonite.

5. The polyolefin resin composition as claimed in claim 1, wherein the total amount of the phenolic compound and phosphorous compound is from 0.01% to 10% by weight based on the polyolefin resin.

6. A method for improving a polyolefin resin in stability to thermal processing, which comprises blending the polyolefin resin with
a phenolic compound in an amount effective to prevent deterioration of the polyolefin resin due to heat and oxidation, and
a phosphorous compound in an amount of 0.5 to 10 times by weight based on the weight of the phenolic compound, said phenolic compound being represented by the formula:

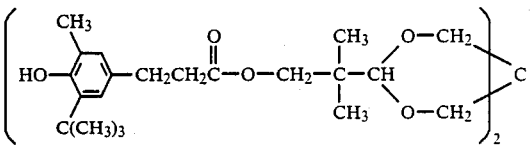

and said phosphorous compound being one member selected from the group consisting of the compounds represented by the structural formulas (IV-1), (IV-2), and (IV-3), recited below:
(a) a phosphite compound represented by the formula (IV-1):

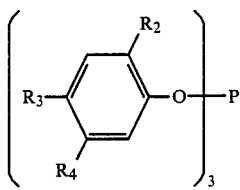

(IV-1)

wherein $R_2$, $R_3$ and $R_4$ each represent a hydrogen atom or a $C_1$–$C_9$ alkyl group, but $R_3$ and $R_4$ are not a branched alkyl group at the same time,
(b) a phosphite compound represented by the formula (IV-2):

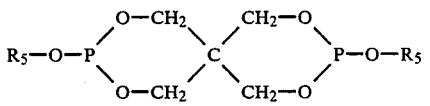

(IV-2)

wherein $R_5$ represents a $C_8$–$C_{18}$ alkyl or $C_6$–$C_{18}$ aryl group, or
(c) a phosphorous compound represented by the formula (IV-3):

$$(R_6-O_2-P-R_7-P-O-R_6)_2 \qquad (IV-3)$$

wherein $R_6$ represents a $C_8$–$C_{18}$ alkyl or $C_6$–$C_{18}$ aryl group, and $R_7$ represents a $C_6$–$C_{18}$ alkylene or a $C_6$–$C_{18}$ arylene group.

7. In a method for producing a polyolefin resin product by thermal processing, the improvement of which comprises subjecting to thermal processing a polyolefin resin blended with a phenolic compound in an amount effective to prevent deterioration of the polyolefin resin due to heat and oxidation and a phosphorous compound in an amount of 0.5 to 10 times by weight based on the weight of the phenolic compound, said phenolic compound being represented by the formula:

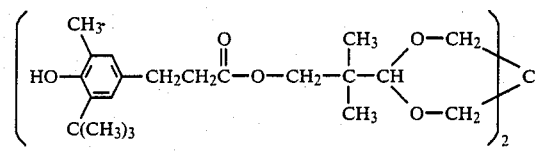

and said phosphorous compound being one member selected from the group consisting of the compounds represented by the structural formulas (IV-1), (IV-2), and (IV-3), recited below:

(a) a phosphite compound represented by the formula (IV-1)

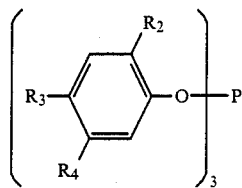

wherein $R_2$, $R_3$ and $R_4$ each represent a hydrogen atom or a $C_1$–$C_9$ alkyl group, but $R_3$ and $R_4$ are not a branched alkyl group at the same time, (b) a phosphite compound represented by the formula (IV-2):

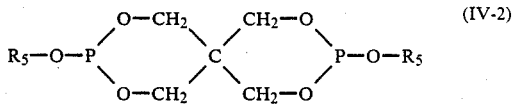

wherein $R_5$ represnets a $C_8$–$C_{18}$ alkyl or $C_6$–$C_{18}$ aryl group, or (c) a phosphorous compound represnted by the formula (IV-3):

$$(R_6-O_2-P-R_7-P-O-R_6)_2 \qquad (IV-3)$$

wherein $R_6$ represents a $C_8$–$C_{18}$ alkyl or $C_6$–$C_{18}$ aryl group, and $R_7$ represents a $C_6$–$C_{18}$ alkylene or a $C_6$–$C_{18}$ arylene group.

* * * * *